(12) United States Patent
Kekki et al.

(10) Patent No.: US 10,524,188 B2
(45) Date of Patent: Dec. 31, 2019

(54) METHOD AND APPARATUS FOR CELLULAR ACCESS POINT CONTROL

(71) Applicant: Nokia Technologies Oy, Espoo (FI)

(72) Inventors: Sami Johannes Kekki, Helsinki (FI); Silke Holtmanns, Klaukkala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/525,465

(22) PCT Filed: Nov. 12, 2014

(86) PCT No.: PCT/FI2014/050851
§ 371 (c)(1),
(2) Date: May 9, 2017

(87) PCT Pub. No.: WO2016/075356
PCT Pub. Date: May 19, 2016

(65) Prior Publication Data
US 2018/0295561 A1    Oct. 11, 2018

(51) Int. Cl.
*H04W 48/02*    (2009.01)
*H04W 76/10*    (2018.01)
*H04W 8/20*    (2009.01)
*H04W 84/04*    (2009.01)
*H04W 88/12*    (2009.01)

(52) U.S. Cl.
CPC ............ *H04W 48/02* (2013.01); *H04W 8/20* (2013.01); *H04W 76/10* (2018.02); *H04W 84/042* (2013.01); *H04W 88/12* (2013.01)

(58) Field of Classification Search
CPC . H04L 63/20; H04L 63/0876; H04L 63/0227; H04L 63/10; H04L 2209/56; H04L 63/083; H04L 9/3226; H04L 9/3234; H04L 9/3271; G06F 21/62; G06F 2221/2103; H04W 12/08; H04W 48/02; H04W 48/08
See application file for complete search history.

(56) References Cited

U.S. PATENT DOCUMENTS 7,508,812 B2    3/2009    Stout et al.
2009/0129280 A1*    5/2009    Stout ................. H04L 69/162
                                                    370/248

(Continued)

FOREIGN PATENT DOCUMENTS

WO    2012068304    5/2012
WO    2012075323    6/2012

OTHER PUBLICATIONS

"Open Mobile Alliance Device Management Protocol", Open Mobile Alliance, Approved Version 2.0, Feb. 9, 2016, pp. 1-105.

(Continued)

*Primary Examiner* — Nizar N Sivji
(74) *Attorney, Agent, or Firm* — Harrington & Smith (57) ABSTRACT

Method, apparatus and computer program for receiving an identification of an application that has issued a connectivity request for cellular communications with a cellular network; determining an access point name to be used for providing the identified application with the cellular communications; and verifying whether the identified access point name use is allowable with the identified application and accordingly allowing or preventing said use.

19 Claims, 4 Drawing Sheets

(56) References Cited

U.S. PATENT DOCUMENTS

2011/0171953 A1   7/2011   Faccin et al.
2011/0225632 A1   9/2011   Ropolyi et al.
2014/0279454 A1   9/2014   Raman et al.

OTHER PUBLICATIONS

"NFC Handset APIs Requirement Specification", GSM Association, Official Document TS.26, Version 4.1, Nov. 2013, pp. 1-26.
"Straight Talk APN Settings for Android Phones [Beginners' Guide]", Droidlife, Retrieved on Jun. 1, 2017, Webpage available at : http://www.droid-life.com/2014/03/04/straight-talk-apn-settings/.
"View and Edit Your Access Point Name (APN) on Your iPhone and iPad", Apple, Retrieved on Jun. 1, 2017, Webpage available at : https://support.apple.com/en-us/HT201699.
International Search Report received for corresponding Patent Cooperation Treaty Application No. PCT/FI2014/050851, dated Apr. 24, 2015, 27 pages.
Extended European Search Report received for corresponding European Patent Application No. 14906037.8, dated May 30, 2018, 6 pages.
"3rd Generation Partnership Project; Technical Specification Group SA; Study of Need for Multiple APNs (Release 13)", 3GPP TR 22.802, V0.4.0, Aug. 2014, pp. 1-14.

\* cited by examiner

METHOD AND APPARATUS FOR CELLULAR ACCESS POINT CONTROL

RELATED APPLICATION

This application was originally filed as PCT Application No. PCT/FI2014/050851 filed Nov. 12, 2014.

TECHNICAL FIELD

The present application generally relates to cellular access point control.

BACKGROUND

This section illustrates useful background information without admission of any technique described herein representative of the state of the art.

Telecommunication networks are being developed in particular by the data transmission properties. The introduction of high-quality sound and possibility of transferring any data at all took place long ago, but there is ever increasing demand for fast data transfer for the needs of people using communication devices. The Internet of things may expand the data transmissions to an extent that is presently difficult to even imagine.

In the long-term evolution (LTE) networks (also often referred to as 4G LTE), there are often multiple access points available to user equipment (UE) for data transfer. Each of these access points has an Access Point Name (APN) that is used for enabling UE to indicate which of many simultaneously available access points should provide the data transmission. The access point in this context may refer to a gateway that interconnects a cellular network such as GPRS, 3G or 4G mobile network to another computer network such as the Internet.

In the LTE, APN is responsible for connectivity requests. Such requests are processed by the Evolved Packet Core (EPC). More particularly, the APN processing may involve the Home Subscriber Server (HSS) node of the EPC.

The HSS stores System Architecture Evolution (SAE) subscription data such as the EPS-subscribed Quality of Service (QoS) profile and any access restrictions for roaming. HSS also contains information about the (Packet Data Networks) PDNs to which the user can connect.

In greater detail, the APN identifies a Gateway GPRS Support Node (GGSN) or Packet Data Network Gateway (P-GW). The APN contains an APN network identifier that defines the Packet Data Network (PDN) to which the connectivity is being requested. The APN may further contain an APN operator identifier that defines the Public Land Mobile Network (PLMN) in which the P-GW or GGSN resides. To this end, the APN has two parts: a network identifier and an operator identifier.

Different APNs may be mapped to different applications by a user via Settings, by pre-provisioning or by Device Management e.g. using OMA Device Management. Consequently, for any such application that requires any special APN, there is a Management Object (MNO) or other MNO provisioned configuration in the device (Mobile Equipment). Other applications are mapped to the "normal" Internet APN. A special APN can be used for company internal tools, for example.

Some unauthorized or unintended applications may attempt to use such APNs that are provided for the UE for special use only (e.g. operator sets up APN for some specific business customer or business).

One issue with the APN is how to enforce the use of particular APN with a given application. The network may, in some cases, deduce the application from the traffic, but often that is only possible only from ongoing communications and with a substantial processing cost for a server of the network.

SUMMARY

Various aspects of examples of the invention are set out in the claims.

According to a first example aspect of the present invention, there is provided an apparatus comprising:
a memory comprising computer executable program; and
at least one processor configured to operate according to the program code, wherein the at least one processor is configured to:
receive an identification of an application that has issued a connectivity request for cellular communications with a cellular network;
determine an access point name to be used for providing the identified application with the cellular communications; and
verify whether the identified access point name use is allowable with the identified application and accordingly allow or prevent said use.

The at least one processor may be configured to form, when operating, an authorized entity. The authorized entity may be configured to perform the acts of the first example aspect.

The apparatus may be within mobile equipment configured to enable cellular communication with the cellular network. The apparatus may comprise the mobile equipment. The mobile equipment may be configured to run the identified application.

The apparatus may perform the determining of the access point name to be used by obtaining said name from the connectivity request.

The authorized entity may be configured to perform said verifying based on stored verification information.

The apparatus may be configured to store verification information so that the verification information is inaccessible by the user of the mobile equipment.

The apparatus may be configured to store verification information in a universal subscriber identity module.

The at least one processor may be configured to perform the verifying within a time that is not perceivable by the user of the apparatus. The at least one processor may be configured to perform the verifying within a time that at most 100 ms or 10 ms.

The verification information may comprise a cryptographic derivative of an identifier of the identified application and of the identified access point name.

The at least one processor may be further configured to form a service request for the cellular network to contain the allowed access point name. The at least one processor may be configured to contain in the service request policy information. The policy information may specify allowed communication protocol or protocols. The policy information may specify one or more security protocols allowed for use with the allowed access point name.

The at least one processor may receive the identification of the application and of the access point to be used from the identified application in a connectivity request.

The apparatus may comprise an operating system that is configured to control general operation of the apparatus; and the at least one processor may be configured to receive the identification of the access point name to be used from the operating system in response to that the operating system receives a connectivity request from the identified application. The operating system may receive the connectivity request from the identified application in a socket creation request. The operating system may be configured to verify from the at least one processor whether the socket creation request is allowable and if yes, to open the requested socket. The opened socket may be bound to the application that requested the socket (i.e. the identified application).

The connectivity request (whether received from the operating system or from the application) may comprise a cryptographic token. The at least one processor may be configured to compare the cryptographic token with an access point name specific token to perform the verifying whether the identified access point name use is allowable. The verification information may comprise the access point name specific token. The access point name specific token may be formed by a public key infrastructure.

According to a second example aspect of the present invention, there is provided a method comprising:

receiving an identification of an application that has issued a connectivity request for cellular communications with a cellular network;

determining an access point name to be used for providing the identified application with the cellular communications; and verifying whether the identified access point name use is allowable with the identified application and accordingly allowing or preventing said use.

The method may be performed in a cellular terminal. The method may be performed by an authorized entity. The cellular terminal may comprise mobile equipment. The mobile equipment may perform cellular communication with the cellular network. The mobile equipment may run the identified application.

The determining of the access point name to be used may be performed by obtaining said name from the connectivity request.

The verification information may be stored so that the verification information is inaccessible by the user of the mobile equipment.

The verifying may be performed based on the stored verification information.

The verification information may be stored in a universal subscriber identity module.

The verifying may be performed within a time that is not perceivable by the user of the apparatus. The verifying may be performed within a time that is at most 100 ms or 10 ms.

The verification information may comprise a cryptographic derivative of an identifier of the identified application and of the identified access point name.

The method may comprise forming a service request for the cellular network to contain the allowed access point name. The method may comprise containing in the service request policy information. The policy information may specify allowed communication protocol or protocols. The policy information may specify one or more security protocols allowed for use with the allowed access point name.

The identification of the application and of the access point to be used may be received from the identified application in a connectivity request.

The method may comprise controlling general operation of the apparatus by an operating system. The identification of the access point name to be used may be received from the operating system in response to that the operating system receives a connectivity request from the identified application. The operating system may receive the connectivity request from the identified application in a socket creation request. The method may comprise verifying for the operating system whether the socket creation request is allowable. The method may comprise opening the requested socket if the socket creation request is allowable. The opened socket may be bound to the application that requested the socket.

The connectivity request (whether received from the operating system or from the application) may comprise a cryptographic token. The method may comprise comparing the cryptographic token with an access point name specific token to perform the verifying whether the identified access point name use is allowable. The verification information may comprise the access point name specific token. The access point name specific token may be formed by a public key infrastructure.

According to a third example aspect of the present invention, there is provided an apparatus according to appended claim 45.

According to a fourth example aspect of the present invention, there is provided a computer program comprising computer executable program code configured to execute any method of the second example aspect, when the computer program is run on a processor.

The computer program may be stored in a computer readable memory medium. The computer readable memory may be a non-transitory memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings. In this document, like reference signs denote like parts or steps.

Figure 1:
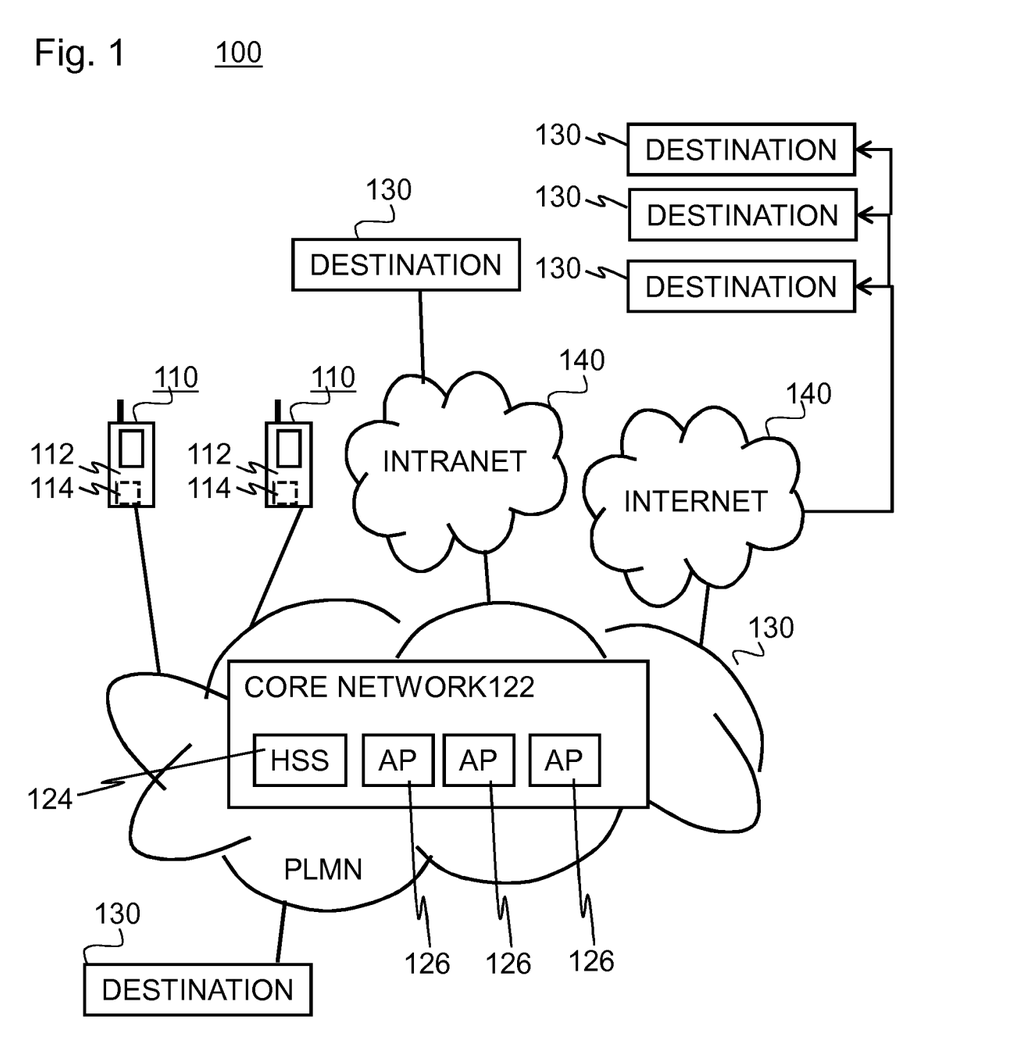
FIG. 1 shows an architectural drawing of a system of an example embodiment.

FIG. 1 shows an architectural drawing of a system 100 of an example embodiment. The system comprises a cellular terminal 110 that is logically formed of mobile equipment 112 and user identification module 114, such as a universal integrated circuit card or a software-implemented subscriber user identification module. The system 100 further comprises a cellular network 120 that comprises a core network 122 provided with a home subscriber server 124 and a plurality of access points 126 associated with a different access point names. The system 100 further comprises a plurality of packet data network accessible destinations 130 interconnected to the core network 122 through the access points 126 and at least one packet data network 140, such as the Internet or an intranet of a corporation. Some destinations are accessible only through a particular gateway (and packet data network).

The generation of data connections between the terminal 110 and a particular destination 140 is enabled by the cellular network 120, when the terminal 110 requests for the connection from a suitable access point using the appropriate access point name. Sometimes, there is a need to limit access for business reasons of the cellular network's operator or of the destination, for example. To this end, some embodiments will be described in the following for mechanisms to perform terminal enforced access control to allow access only to particular destinations and by particular application(s) running in the terminal. Before proceeding to describe the functions, let us first describe some suitable structures with reference to FIG. 2.

Figure 2:
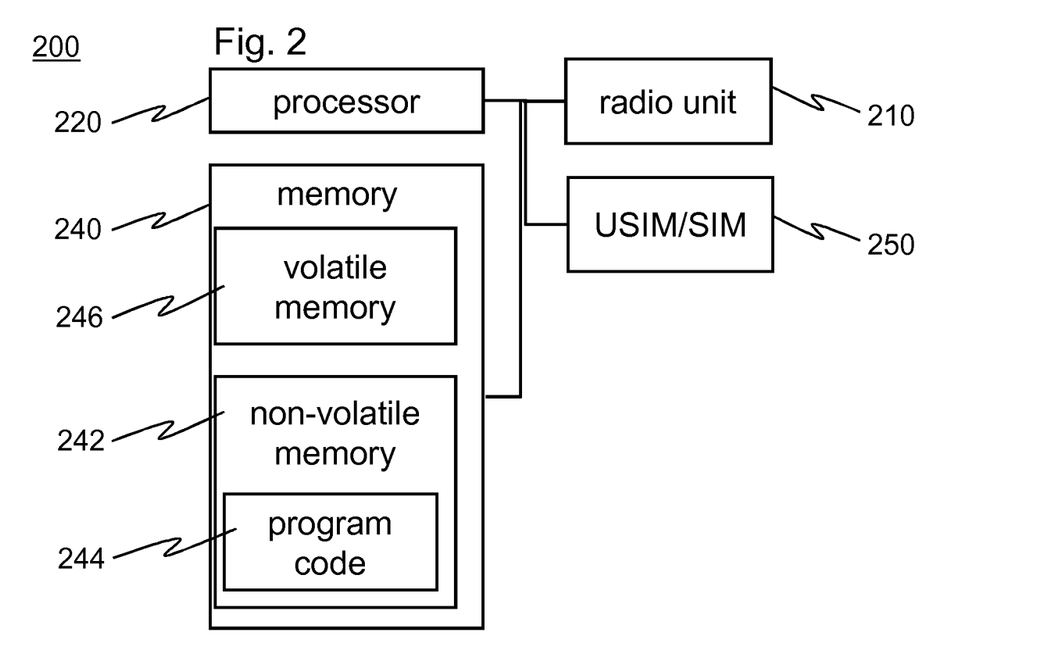
FIG. 2 shows a block diagram of an apparatus of an example embodiment.

FIG. 2 shows a block diagram of an apparatus 200 of an example embodiment. The apparatus 200 comprises a memory 240 including a persistent memory 242 that stores computer program code 244 (e.g. applications and operating system) and a volatile memory or work memory 246. The persistent or non-volatile memory 242 is formed using, for example, one or more of: read only memory; flash-random access memory; optical memory; magnetic memory; hard disk drive; and synchronous dynamic random access memory. The work memory is formed, for example, of a random access memory; synchronous dynamic random access memory; and/or double data rate synchronous dynamic random access memory. The apparatus 200 further comprises a processor 220 for controlling the operation of the apparatus 200 by running the computer program code 242 in the work memory 246. The apparatus 200 further comprises a radio unit 210 for communicating with the cellular network 120. The radio unit 210 comprises, for example, a Universal Mobile Telecommunications System communication unit; a long-term evolution radio unit; or satellite data communication unit. The processor 220 comprises, for example, any one or more of: a master control unit; a microprocessor; a digital signal processor; an application specific integrated circuit; a field programmable gate array; and a microcontroller.

The apparatus 200 further comprises a subscriber identity module 250 that is either a software entity formed by the non-volatile memory 242; computer executable code 244 and particular information stored in the non-volatile memory, or a hard-ware unit that can be plugged in or permanently mounted in the apparatus 200. For example, the subscriber identity module 250 can be formed using a universal subscriber identity module that is stored and run by equipment of a universal integrated circuit card.

Figure 3:
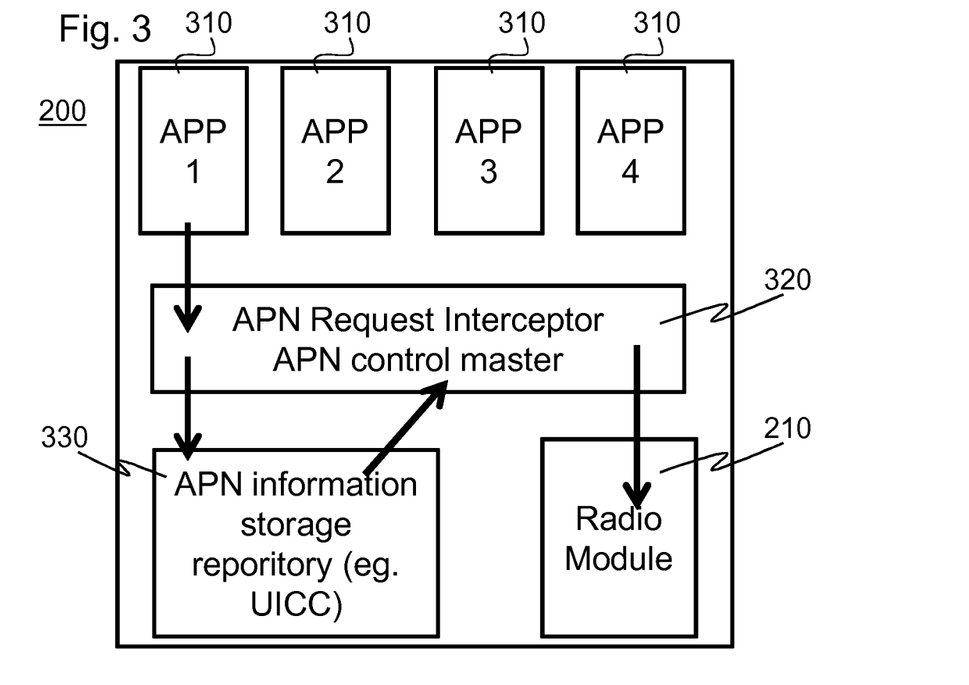
FIG. 3 shows a functional block diagram of the apparatus of FIG. 2.

FIG. 3 shows a functional block diagram of the apparatus 200. FIG. 3 shows a plurality of applications 310 (named as APP1 to APP4) that need radio access to general or particular destinations; an authorized entity 320 configured to process access point name requests; an access point name information storage 330; and the radio unit 210. In an example embodiment, the authorized entity 320 is formed by the processor 220 and the memory 240 of the apparatus 200. In an example embodiment, the authorized entity is formed at least in part using a processor and/or memory of the subscriber identity module. The access point name information storage can be formed by the non-volatile memory 242 or by a memory of the subscriber identity module 250, for example. It is also possible to use as the access point name information storage 330 any of: a trusted computing platform; a trusted program module; host card emulation; and a secure digital card. Further, the access point name information storage 330 may be formed using one storage or storage area in the non-volatile memory 242 for public access point name information and another storage or storage area in more trusted memory such as the memory of the subscriber identity module 250.

Figure 4:
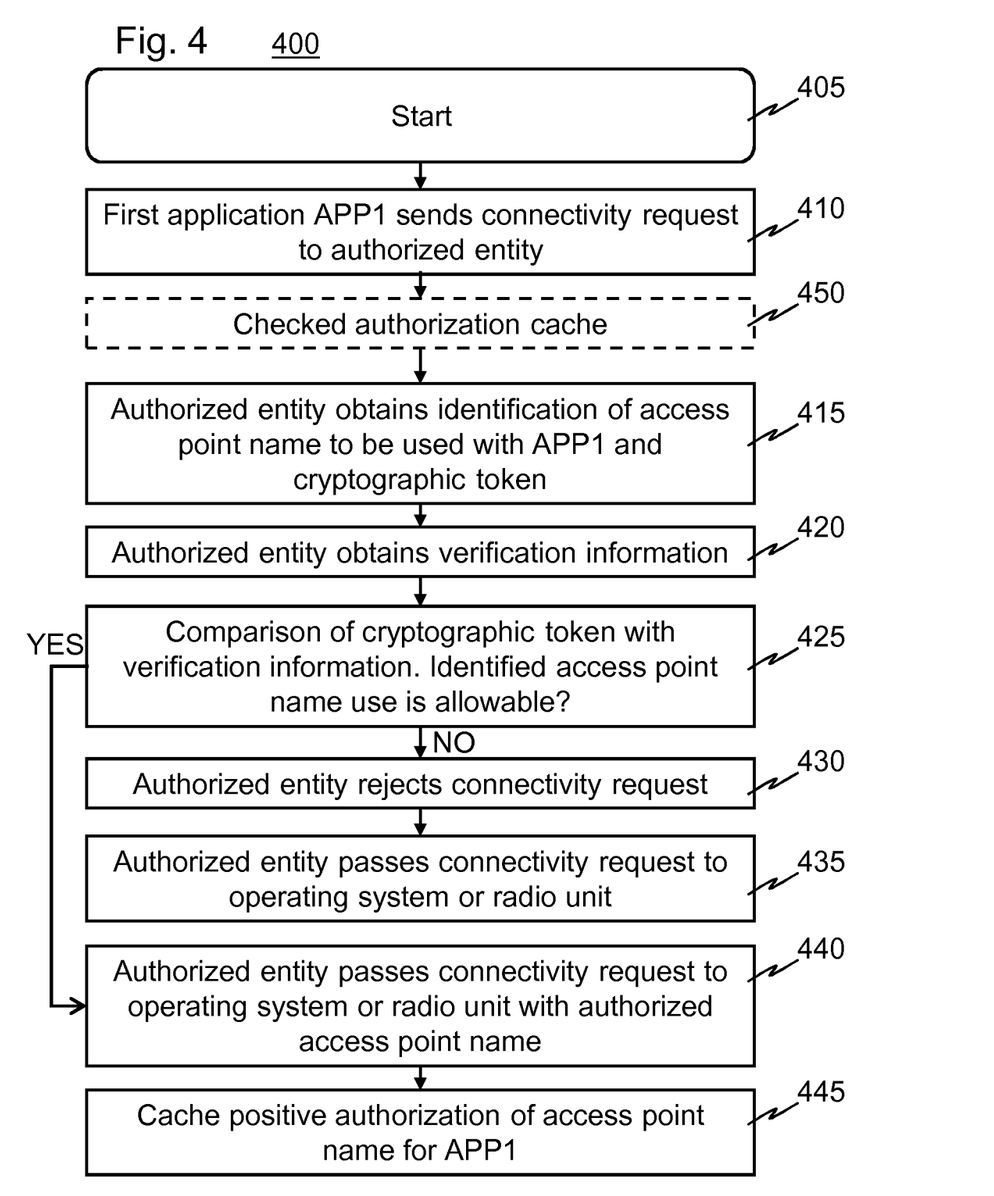
FIG. 4 shows a flow chart that explains one example of the use of an the at least one processor and memory for enforcing access point use by a cellular terminal.

FIG. 4 shows a flow chart that explains one example of the use of the authorized entity 320 for enforcing access point use by the cellular terminal 110. FIG. 4 shows a process 400 that starts from beginning 405 in which the cellular terminal 110 is running: the cellular terminal is registered to a cellular network and the radio unit 210 is able to send connectivity requests and to perform radio communications over a radio interface provided by the cellular network.

In connection of FIG. 4 description, it is assumed that any of the applications 310 that requires a specific access point is controlled either by the mobile network operator, a machine to machine service provider or other such party that has a business relationship with the entity whose access points are being used (typically mobile network operators).

In an example embodiment, the access point enforcement does not secure the access point information as such, but instead it secures the use of any access point by the application. If the access point information or the mapping of the access point and the application(s) is edited (tampered) by the end user, the access point enforcement in the authorized entity detects such tampering. However, in some embodiments, the access point information maintained in a secure storage without any access by the end user to it. At present, the most common location for the access point information is the in the memory of the cellular terminal 110, where that information is typically editable by the user of the terminal.

In step 410, a first application APP1 sends a connectivity request to the authorized entity 320. In response, the authorized entity 320 obtains 415 from the connectivity request an identification of an access point name to be used with the application in question and a cryptographic token that should authorize the use of the identified access point name. The cryptographic token is provided, for example, on installing of the application; on activating the application; by provisioning by a mobile network operator or provider of the application; and on first use of the application (e.g. using the default access point if no particular access point name can be authorized before obtaining of the cryptographic token).

The authorized entity 320 obtains 420 verification information from the access point name information storage 330 and compares 425 the cryptographic token with the verification information to verify whether the identified access point name use is allowable or to validate authorization of the connectivity request. In an example embodiment, the verification information comprises an access point name specific token that can be, for example, a token formed by a public key infrastructure or a cryptographic hash code.

In an example embodiment, the authorized entity obtains the verification information from the access point name information storage 330 using normal application protocol data unit commands to the universal integrated circuit card according to the storage place of the access point name information.

In an example embodiment, the connectivity request comprises: requested access point name data (such as identification of a company APN or of a given mobile network operator's APN); and a proof of authorization of the request (the cryptographic token, for example). In an example embodiment, the request is cryptographically protected. The cryptographic protection comprises one or more of: cryptographic signing; confidentiality indication; integrity protection by use of a secure channel, for example, possibly combined with a cryptographic signature that is based on an identification of the secure channel used for transfer of the connectivity request to the authorized entity 320.

In an example embodiment, the cryptographic token employs public key infrastructure. For example, the application can be configured to use a cryptographic hash of an identification of the application signed with the private key of the application and the authorized entity can then validate the key with the data that is stored alongside the access point name in the access point name information storage 330.

It may be understood that the authorized entity 320 may validate or authorize the connectivity request by determining that the application that needs a particular access point name has access to information that should not be available if that application were not authorized to use that access point name.

If the application is not authorized to use a particular access point name (e.g. the one identified by the connectivity request or one indicated by the access point name information storage 330), the authorized entity can, depending on implementation, reject the request 430 or pass 435 the request to the operating system or to the radio unit 210 indicating a default access point name or no access point name at all. Without an access point name, the cellular network can determine the access point name to use based on information stored in the profile of the user or subscriber of the cellular terminal 110 in the core network or the Home Subscriber Server.

If the application is authorized to use the particular access point name, the authorized entity 320 passes 440 the request to the operating system or to the radio unit 210 indicating the validated or authorized access point name for forming a connection using that access point name. The positive authorization or validation of the access point name for the application that is in question can be cached, 445 for further use. The caching can be time restricted to be usable for a predetermined time or until the end of the current day, week or month. If the validation is cached, the authorized entity can check 450 its validation cache next time it receives a connectivity request and allow use of the access point name without further processing, if it finds a cached validation. The cache may be stored in the volatile memory 246 or in the access point name information storage 330.

In an example embodiment, access point name information storage 330 (and the validation cache if one is maintained) is configured to store connection control information such as one or more additional policy for one or more of the access point names contained by the access point name information storage 330. Such connection control information comprises, for example, any one or more of: a security policy definition (TLS, IPSec, for example); Quality of Service parameter(s); desired and/or mandatory quota definition; and desired and/or mandatory data rate limitation.

Figure 5:
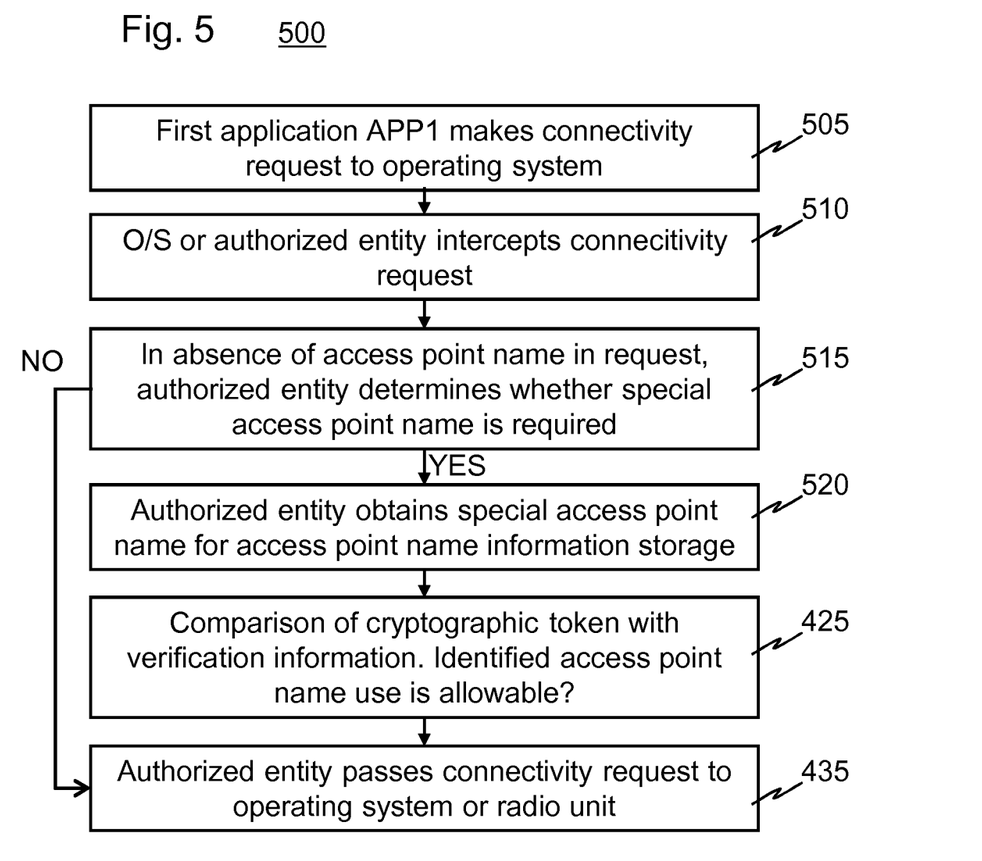
FIG. 5 shows a flow chart of a process of another example embodiment for enforcing access point use by a cellular terminal.

FIG. 5 shows a flow chart of a process 500 of another example embodiment. In FIG. 5, the connectivity request is made 505 to the operating system and the operating system or the authorized entity intercepts 510 the connectivity request for processing of the authorized entity 320. For example, an application APP1 requests connectivity from the operating system to create a communication socket. The operating system then passes the relevant information, including at least the operating system specific application identity, to the authorized entity. This information may also contain the afore-described cryptographic token, but alternatively, the connectivity request does not comprise an access point name identification at all. In such a case, the authorized entity 320 determines 515 itself whether a special access point name is required. If not, the connectivity is created 435 by the radio unit 210 by using the default access point name or without one in which case it is the network that then assigns the access point name per subscription information in the home subscriber server. On the other hand, if the authorized entity determines 515 that the special access point name is required, the authorized entity queries or obtains 520 it from the access point name information storage 330, checks 425 the application-access point name authorization, and passes 435 the access point name to the radio unit 210 where it is then used in the creation of the connectivity accordingly. The socket is then bound to the application in question.

It is notable that different applications may behave differently in that some application(s) do include in the connectivity request the cryptographic token while some other application(s) fail to do so.

Without in any way limiting the scope, interpretation, or application of the claims appearing below, a technical effect of one or more of the example embodiments disclosed herein is that implementing enforcement of access point name selection for given application in the cellular terminal may remove the need of the mobile network operator to enforce the use of different access point names in the network with processing intensive mechanisms such as deep packet investigation mechanisms in the Packet Gateway.

Another technical effect of one or more of the example embodiments disclosed herein is that the enforcement of access point name selection may reduce the risk of denial of service attacks via botnets of cellular terminals against core network elements of the cellular network.

Embodiments of the present invention may be implemented in software, hardware, application logic or a combination of software, hardware and application logic. The software, application logic and/or hardware may reside on the mobile equipment or user identity module. If desired, part of the software, application logic and/or hardware may reside on the mobile equipment and part of the software, application logic and/or hardware may reside on the subscriber identity module. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. An apparatus, comprising:
   at least one processor; and
   at least one non-transitory memory, the at least one processor and the at least one non-transitory memory being configured to:
   receive an identification of a particular application that has issued a connectivity request for cellular communications with a cellular network, wherein the particular application is one of a plurality of different applications associated with a user;
   receive an identification of an access point name, or determine the access point name, to be used for providing the identified particular application with cellular communications with the cellular network;
   verify whether the identified access point name use is allowable within a predetermined time with the identified particular application;
   when the identified access point name use is not allowable with the identified particular application, perform a first predetermined operation, wherein the first predetermined operation comprises at least one of:
   rejecting the connectivity request, or
   indicating a default access point name; and
   when the identified access point name use is allowable with the identified particular application, perform a different second predetermined operation, wherein the different second predetermined operation comprises indicating that the identified access point name is allowable.

2. The apparatus of claim 1, wherein the at least one processor is configured to perform said verifying based on stored verification information.

3. The apparatus of claim 2, further configured to store the verification information in a universal subscriber identity module.

4. The apparatus of claim 2, wherein the verification information comprises a cryptographic derivative of an identifier of the identified particular application and of the identified access point name.

5. The apparatus of claim 2, wherein the apparatus is configured to operate within mobile equipment that is configured to enable cellular communication with the cellular network.

6. The apparatus of claim 2, further configured to store the verification information so that the verification information is inaccessible to the user.

7. The apparatus of claim 1, wherein the apparatus is configured to operate within mobile equipment that is configured to enable cellular communication with the cellular network; and
   the mobile equipment is configured to run the identified particular application.

8. The apparatus of claim 1, wherein the at least one processor is configured to perform the determining of the access point name, comprising obtaining said access point name from the connectivity request.

9. The apparatus of claim 1, wherein the at least one processor is configured to perform the verifying within a time the user of the apparatus cannot perceive.

10. The apparatus of claim 1, wherein the at least one processor is configured to form a service request for the cellular network to contain the allowed access point name.

11. The apparatus of claim 10, wherein the at least one processor is configured to form the service request for the cellular network to contain policy information.

12. The apparatus of claim 11, wherein the policy information specifies allowed communication protocol or protocols.

13. The apparatus of claim 11, wherein the policy information specifies one or more security protocols allowed for use with the allowed access point name.

14. The apparatus of claim 1, wherein the at least one processor is configured to receive the identification of the particular application and of the access point name from the identified particular application in the connectivity request.

15. A method, comprising:
   receiving an identification of a particular application that has issued a connectivity request for cellular communications with a cellular network,
   wherein the particular application is one of a plurality of different applications associated with a user;
   determining an access point name to be used for providing the identified particular application with the cellular communications;
   verifying whether the identified access point name use is allowable within a predetermined time with the identified particular application;
   when the identified access point name use is not allowable with the identified particular application, performing a first predetermined operation, wherein the first predetermined operation comprises at least one of:
   rejecting the connectivity request, or
   indicating a default access point name; and
   when the identified access point name use is allowable with the identified particular application, performing a different second predetermined operation, wherein the different second predetermined operation comprises indicating that the identified access point name is allowable.

16. The method of claim 15, wherein the verifying is performed based on stored verification information.

17. The method of claim 16, wherein the verification information is stored in a universal subscriber identity module.

18. The method of claim 16, wherein the verification information is stored so that the verification information is inaccessible to the user.

19. A non-transitory computer-readable medium encoded with instructions that, when executed with a computer, perform:
- receiving an identification of a particular application that has issued a connectivity request for cellular communications with a cellular network,
- wherein the particular application is one of a plurality of different applications associated with a user;
- determining an access point name to be used for providing the identified particular application with the cellular communications;
- verifying whether the identified access point name use is allowable within a predetermined time with the identified particular application;
- when the identified access point name use is not allowable with the identified particular application, performing a first predetermined operation, wherein the first predetermined operation comprises at least one of:
  - rejecting the connectivity request, or
  - indicating a default access point name; and
- when the identified access point name use is allowable with the identified particular application, performing a different second predetermined operation, wherein the different second predetermined operation comprises indicating that the identified access point name is allowable.

* * * * *